US006298179B1

(12) United States Patent
Nishikawa et al.

(10) Patent No.: US 6,298,179 B1
(45) Date of Patent: Oct. 2, 2001

(54) OPTICAL PUMPING FIELD EMISSION TYPE LIGHT-TO-CURRENT CONVERTER

(75) Inventors: Osamu Nishikawa, Kanazawa; Kunio Nakajima, Chiba, both of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/205,857

(22) Filed: Dec. 4, 1998

(30) Foreign Application Priority Data

Dec. 5, 1997 (JP) .................................................. 9-336131

(51) Int. Cl.[7] ..................................................... G02B 6/26

(52) U.S. Cl. ............................................................ 385/15

(58) Field of Search ....................... 385/14, 15, 129–133, 385/147; 372/69, 70; 250/214.1, 214 VT, 207

(56) References Cited

U.S. PATENT DOCUMENTS 5,362,972 * 11/1994 Yazawa et al. .

FOREIGN PATENT DOCUMENTS 0209643 8/1989 (JP) .

* cited by examiner

*Primary Examiner*—Frank G. Font
*Assistant Examiner*—Tu T. Nguyen
(74) *Attorney, Agent, or Firm*—Adams & Wilks

(57) ABSTRACT

A simplified field emission type light-to-current converter having a high sensitivity and high-speed response (on the order of picoseconds) which obtains a large field emission current comprises an optical pumping field emission type light-to-current converter. In one embodiment, the optical pumping field emission type light-to-current converter includes an optical waveguide through which light may be propagated, a conductive transparent film, one of a semiconductor material and an insulating material, and a conductor. The waveguide, conductive transparent film, and insulator or semiconductor are joined to each other such that when light is projected through the waveguide and a bias voltage is applied across the conductive transparent film and the conductor, a field emission current is obtained. A light emission side of the optical wave guide material is in contact with the transparent conductive film and may be provided with a sharpened end portion or a plurality of needle-like projections formed therein.

16 Claims, 2 Drawing Sheets

OPTICAL PUMPING FIELD EMISSION TYPE LIGHT-TO-CURRENT CONVERTER

BACKGROUND OF THE INVENTION

The present invention relates to an optical detector which is generally used in optical communication, and to an optical information apparatus, optical measurement, an analysis apparatus and the like.

Heretofore, the devices which have been most generally used as light-to-current converters are photomultipliers, charged coupled devices ("CCDs"), and photodiodes.

With respect to photomultipliers, an advantage thereof is that the photomultiplier responds to very weak light and hence the amplification factor thereof is large, while a disadvantage thereof is that the response speed is low, i.e., on the order of microseconds, the conversion current is small, i.e., on the order of microamperes, and the correlation between light intensity and current density varies to some degree whereby both the dark current and the noise levels are large.

In addition, the CCD does not directly convert light into current, but temporarily converts light into electric charge and then converts the electric charge into current in the stage of reading the electric charge. For this reason, the CCD has an advantage in that the correlation between light intensity and current is extremely high, while it has a disadvantage in that the response speed is low due to the two stages of the conversion process. In addition, the conversion mechanism of the CCD is complicated.

Further, with respect to the photodiode, it is an advantage that the bandwidth is wide, i.e., 20 GHz, while it is a disadvantage that the range of operation temperatures is narrow, i.e., in the range of 10 to 40° C.

It is an object of the present invention to provide an optical pumping field emission type light-to-current converter which utilizes field emission so that the amount of field emission current is increased to realize a response speed on the order of picoseconds ($10^{-12}$ seconds) and having a structure that is simplified.

SUMMARY OF THE INVENTION

An optical pumping field emission type light-to-current converter according to the present invention utilizes field emission in order to solve the above-described problems associated with the prior art.

The basic principles will hereinafter be described. When applying a negative bias voltage to the sharp tip of a needle-like structure made of a conductive material, a high electric field is generated at the sharp tip of the needle-like structure to reduce the potential barrier against electrons which are shut in the surface of the sharp tip of the needle-like structure. As a result, there is an increased probability that the electrons in the surface are emitted to the outside on the basis of Heisenberg's uncertainty principle. This phenomenon is referred to as field emission. In the needle-like structure of the conductor made of metal or the like, the amount of emission current varies greatly depending on the electric field strength at the sharp tip of the needle-like structure, and does not respond to light which is incident on the sharp tip of the needle-like structure. However, in the semiconductor, in particular, a semiconductor material which has electrical characteristics close to that of an insulator, or an insulating material, when light is incident on the sharp tip of the needle-like structure, the optical conductivity is increased momentarily so that the amount of field emission current becomes extremely large. A device in which such principles are applied is referred to herein as an optical pumping field emission type light-to-current converter.

An optical pumping field emission type light-to-current converter according to the present invention is constructed by joining an optical waveguide material through which light is propagated, a conductive transparent film, a semiconductor material or an insulating material, and a conductor material to each other, and the light emission side of the optical waveguide material has a sharpened shape, whereby the intensity of light which has been made incident on the optical wave guide material is detected at high sensitivity and at high-speed response.

DETAILED DESCRIPTION OF THE PREFERRED EMBODIMENTS

Embodiments of an optical pumping field emission type light-to-current converter according to the present invention will hereinafter be described in detail with reference to the accompanying drawings. The present invention increases, by utilizing the field emission, the amount of field emission current and realizes a response speed on the order of picoseconds, and also provides an optical pumping field emission type light-to-current converter having a simplified structure.

Figure 1:
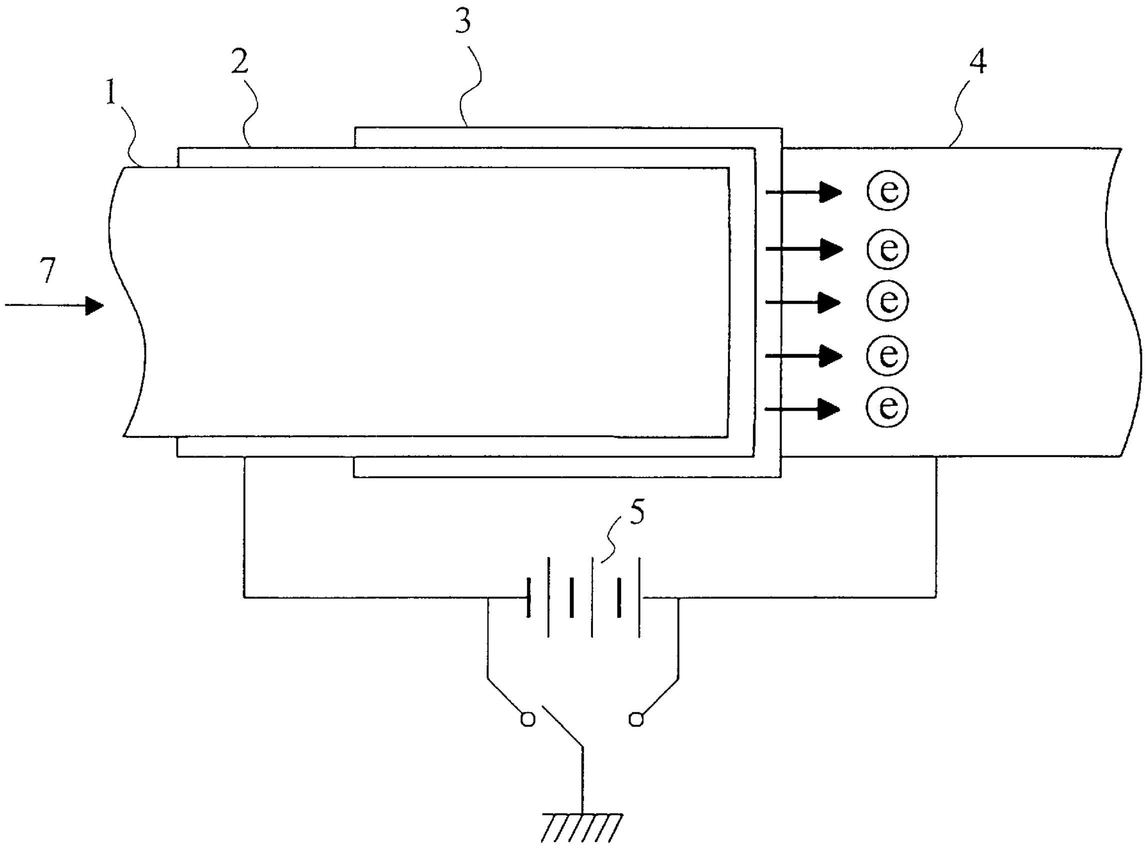
FIG. 1 is a schematic view showing the structure of an optical pumping field emission type light-to-current converter according to a first embodiment of the present invention.

FIG. 1 is a schematic view showing the structure of an optical pumping field emission type light-to-current converter according to a first embodiment of the present invention. In FIG. 1, reference numeral 1 designates a glass series fiber acting as an optical wave guide material.

The end of the light emission side is coated with a conductive transparent film 2. In this connection, in the present embodiment, an ITO ($In_2O_3$:Sn) film of about 0.1 μm in thickness is formed on the end of the light emission side of the optical wave guide material 1 by an electron beam evaporation system (EB evaporation system). While the ITO film is formed by utilizing the EB evaporation system, it will be appreciated that the ITO film may also be formed by utilizing sputtering techniques, metal fog techniques, spray methods or the like.

In addition, the conductive transparent film 2 is coated with a semiconductor material or an insulating material.

In the present embodiment, an $SiO_2$ film is employed as an insulating film 3, and the TEOS (Tetra Ethylortho Silicate)—CVD method is employed as the method of forming the same. It is necessary for the $SiO_2$ film to have a sufficient thickness so that the height of the needle-like structure of the tip of the glass fiber, i.e., a height of about 10 μm is thoroughly covered. For this reason, an $SiO_2$ film of about 20 μm in thickness is deposited thereon. Thereafter, the surface of the $SiO_2$ film thus formed is polished such that the distance between the surface of the $SiO_2$ film and the tip of the needle like structure having the conductive transparent film formed thereon becomes equal to or smaller than 0.1 μm.

One end of the glass fiber 1 having the needle-like structure of about 10 $\mu$m in h eight is coated with the ITO ($In_2O_3$:Sb) film of 0.1 $\mu$m in thickness as the conductive transparent film 2 and the $SiO_2$ film as the insulating film 3 in this order, and also the surface of the $SiO_2$ film is polished to be flattened.

A conductor material 4 is joined to the surface of the $Sio_2$ film, and a bias voltage 5 is applied across the conductive transparent film 2 formed on the glass fiber and the conductor material 4 such that the electric potential of the conductive transparent film becomes negative, whereby the resultant device of interest can be operated as an optical pumping field emission type light-to-current converter.

A second embodiment of the present invention will hereinbelow be described with reference to the attached drawings. An object of the embodiment is, similarly to the above-mentioned first embodiment, to provide an optical pumping field emission type light-to-current converter, in which the tip of the conductive material is sharpened to be needle-like in structure so that the electrons in the surface of the sharp tip can be emitted at a higher probability.

Figure 2:
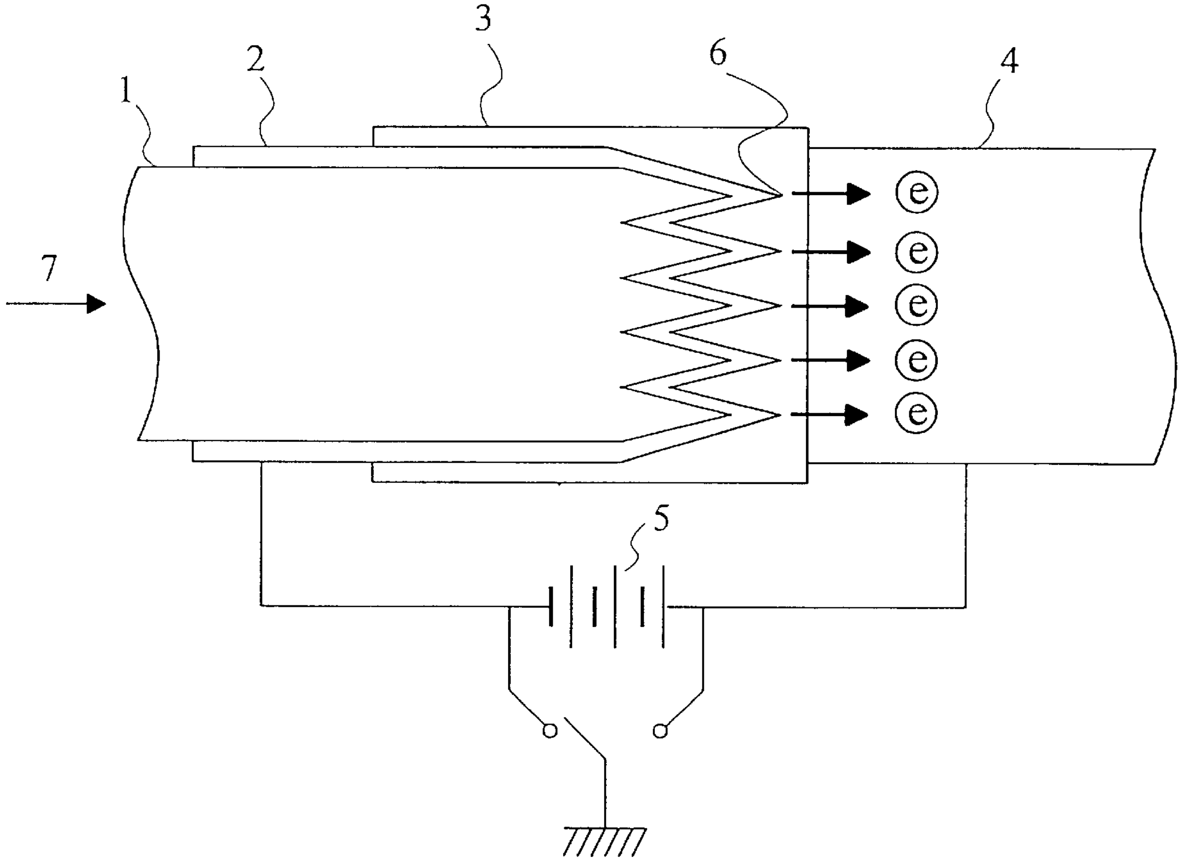
FIG. 2 is a schematic view showing the structure of an optical pumping field emission type light-to-current converter according to a second embodiment of the present invention.

FIG. 2 is a schematic view showing the structure of an optical pumping field emission type light-to-current converter according to the second embodiment of the present invention. In FIG. 2, reference numeral 1 designates a glass series fiber as an optical wave guide material one end of which has a plurality of sharpened needle like structures 6. As for the method of forming the needle like structures 6, the surface is formed to be irregularly uneven by utilizing a blasting method wherein grinding stones used to roughen a surface are blasted onto the surface, or a polishing method to form the needle-like structures by mechanical means. In this connection, the height of each of the needle-like structures is equal to or smaller than about 10 $\mu$m. Alternatively, in addition to the mechanical process, needle-like structures, each of about several hundreds of microns in height, may be formed by utilizing a method employing RIE (Reactive Ion Etching) system or a wet etching method.

One end of the glass fiber, including the needle-like structures formed as described above, is coated with the conductive transparent film 2. In this connection, in the present embodiment, an ITO ($In_2O_3$:Sn) film of about 0.1 $\mu$m in thickness is formed as the conductive transparent film 2 utilizing an electron beam evaporation system (EB evaporation system). While the ITO film is formed by utilizing an EB evaporation system, it will be appreciated that the ITO film may also be formed utilizing sputtering techniques, metal fog techniques, or spray methods.

Then, the conductive transparent film 2 is further coated with a semiconductor material or an insulating material. In the present embodiment, an $SiO_2$ film is employed as an insulating film 3, and the TEOS (Tetra Ethylortho Silicate)—CVD method is employed as the method of forming the same. It is necessary for the $SiO_2$ film to have a sufficient thickness so that the height of the needle-like structures of the tip of the glass fiber, i.e., a height of about 10 $\mu$m, is thoroughly covered. For this reason, an $SiO_2$ film of about 20 $\mu$m in thickness is deposited thereon. Thereafter, the surface of the $SiO_2$ film thus formed is polished such that the distance between the surface of the $SiO_2$ film and the tip of each of the needle-like structures having the conductive transparent film becomes equal to or smaller than 0.1 $\mu$m.

One end of the glass fiber 1 having the needle-like structures each of about 10 $\mu$m in height is coated with the ITO ($In_2O_3$:Sb) film of 0.1 $\mu$m in thickness as the conductive transparent film 2 and the $SiO_2$ film as the insulating film 3 in this order, and also the surface of the $SiO_2$ film is polished to be flattened.

A conductor material 4 is joined to the surface of the $SiO_2$ film, and then a bias voltage 5 is applied across the conductive transparent film 2 formed on the glass fiber an d the conductor material 4 such that the electric potential of the conductive transparent film 2 becomes negative, whereby the resultant device of interest can be operated as the optical circuit incorporated optical pumping field emission type light-to-current converter.

When the incident light is projected onto the other end of the grass fiber having no needle-like structure as shown in FIG. 2, and then the tips of the needle-like structures are irradiated with the incident light, the optical conductivity is momentarily increased under the structure of FIG. 2 so that the field emission current becomes extremely large.

As set forth hereinabove, an optical pumping field emission type light-to-current converter is constructed by joining a sharpened optical waveguide material, a conductive transparent film, a semiconductor material or an insulating material, and a conductor to each other, so that the field emission current becomes extremely large. For this reason, a response speed which is equal to or higher than picoseconds ($10^{-12}$ seconds) becomes possible. In addition, the amount of conversion current depends on the shape and the number of needles of the needle-like structure with which the field emission is provided, and the bias voltage, and hence the conversion current of 10 milliamperes or more can be expected. In addition, the structure thereof can be made extremely simple, and scaling down is made possible. Also, due to the scaling down ability, the optical pumping field emission type light-to-current converter is excellent in mechanical strength. Further, the operating temperatures thereof can be extended from very low temperatures to about 400° C., thereby realizing low noise characteristics.

What is claimed is:

1. An optical pumping field emission type light-to-current converter comprising: an optical waveguide through which light may be propagated and which has a sharpened tip portion at a light emission side thereof; a conductive transparent film; one of a semiconductor material and an insulating material; and a conductor; wherein the optical waveguide, the conductive transparent film and the semiconductor material or insulating material are joined together such that when light is projected through the optical waveguide and a voltage is applied between the conductive transparent film and the conductor, a field emission current is obtained.

2. An optical pumping field emission type light-to-current converter according to claim 1; wherein the conductive transparent film is formed on the light emission side of the optical waveguide.

3. An optical pumping field emission type light-to-current converter according to claim 1; wherein the optical waveguide comprises an optical fiber, and the light emission side of the optical fiber is in contact with the conductive transparent film and has one or more needle-like projections.

4. An optical pumping field emission type light-to-current converter according to claim 3; wherein a radius of curvature of the needle-like projections is equal to or smaller than 1 $\mu$m.

5. An optical pumping field emission type light-to-current converter according to claim 3; wherein the optical fiber is made of glass.

6. An optical pumping field emission type light-to-current converter according to claim 3; wherein a height of the needle-like projections is in the range of about 1 $\mu$m to 500 $\mu$m.

7. An optical pumping field emission type light-to-current converter according to claim 1; wherein a plurality of needle-like projections are formed at the light emission side of the optical waveguide, the height of the needle-like projections is in the range of about 1 $\mu$m to 500 $\mu$m, and the spacing between the needle-like projections is in the range of about 0.1 $\mu$m to 500 $\mu$m.

8. An optical pumping field emission type light-to-current converter according to claim 1; wherein the light emission side of the optical waveguide has one or more needle-like projections, the conductive transparent film is in contact with the needle-like projections, and the conductive transparent film comprises a transparent material containing one or more of $Sn_2O_3$, $In_2O_3$, ZnO, and a material through which light having a specific wavelength penetrates.

9. An optical pumping field emission type light-to-current converter according to claim 8; wherein a thickness of the conductive transparent film contacting the needle-like projections formed at the light emission side of the optical waveguide is in the range of about 0.001 $\mu$m to 1 $\mu$m.

10. An optical pumping field emission type light-to-current converter according to claim 8; wherein the conductive transparent film is covered with the one of a semiconductor material and an insulating material.

11. An optical pumping field emission type light-to-current converter according to claim 1; wherein one or more needle-like projections are formed at the light emission side of the optical waveguide, the conductive transparent film is in contact with the needle-like projections, the one of the semiconductor material or the insulating material is in contact with the conductive transparent film, and the conductor is in contact with the one of the semiconductor material or the insulating material, and wherein optical axes of the needle-like projections, the conductive transparent film, the one of the semiconductor material or the insulating material and the conductor are aligned with each other.

12. An optical pumping field emission type light-to-current converter according to claim 1; wherein one or more needle-like projections are formed at the light emission side of the optical waveguide, the conductive transparent film is in contact with the needle-like projections, and the one of the semiconductor material or the insulating material is in contact with the conductive transparent film; and further comprising a thin film acting as an optical filter inserted between the needle-like projections and the conductive transparent film.

13. An optical pumping field emission type light-to-current converter according to claim 1; wherein the optical waveguide comprises an optical fiber.

14. An optical pumping field emission type light-to-current converter according to claim 1; wherein one or more needle-like projections are formed at the light emission side of the optical waveguide, the conductive transparent film is in contact with the light emission side of the optical waveguide, and the semiconductor material or the insulating material is in contact with the conductive transparent film and comprises at least one of diamond, $SiO_2$, and GaAs.

15. An optical pumping field emission type light-to-current converter according to claim 14; wherein a plurality of the needle-like projections are formed at the light emission side of the optical waveguide and the spacing between the needle-like projections is in the range of about 0.001 $\mu$m to 0.1 $\mu$m.

16. An optical pumping field emission type light-to-current converter, comprising: an optical waveguide through which light may be propagated and which has a sharpened tip portion at a light emission side thereof; a conductive transparent film in contact with the optical waveguide; one of a semiconductor material and an insulating material in contact with the conductive transparent film; and a conductor in contact with the semiconductor material or the insulating material, so that when a voltage is applied between the conductive transparent film and the conductor, a field emission current is obtained.

* * * * *